(12) United States Patent
Anderson

(10) Patent No.: US 7,176,153 B2
(45) Date of Patent: Feb. 13, 2007

(54) REFRACTORY SYSTEM FOR GLASS MELTING FURNACES

(75) Inventor: Michael W. Anderson, West Chicago, IL (US)

(73) Assignee: Magneco/Metrel, Inc., Addison, IL (US)

(*) Notice: Subject to any disclaimer, the term of this patent is extended or adjusted under 35 U.S.C. 154(b) by 134 days.

(21) Appl. No.: 10/731,343

(22) Filed: Dec. 9, 2003

(65) Prior Publication Data

US 2004/0138048 A1    Jul. 15, 2004

Related U.S. Application Data

(60) Provisional application No. 60/432,503, filed on Dec. 10, 2002.

(51) Int. Cl.
*C04B 35/185* (2006.01)
*C04B 35/48* (2006.01)

(52) U.S. Cl. ............ 501/107; 501/105; 65/374.13
(58) Field of Classification Search ........ 501/105, 501/107, 104; 65/374.13
See application file for complete search history.

(56) References Cited

U.S. PATENT DOCUMENTS

| 4,119,472 A | 10/1978 | Brashear, Jr. et al. | |
| 4,212,680 A * | 7/1980 | Schulz | 501/153 |
| 5,403,794 A * | 4/1995 | Morris et al. | 501/105 |
| 5,900,382 A * | 5/1999 | Shaw | 501/133 |
| 6,158,248 A * | 12/2000 | Beppu | 65/374.13 |
| 2004/0266604 A1 * | 12/2004 | Guigonis et al. | 501/105 |

FOREIGN PATENT DOCUMENTS

| DE | 198 45 761 A1 | 4/2000 |
| EP | 0 193 751 A2 | 9/1986 |
| EP | 0 298 860 A1 | 1/1989 |
| GB | 967934 | 8/1964 |
| GB | 993161 | 5/1965 |
| GB | 1184729 | 3/1970 |
| GB | 1194158 | 6/1970 |
| GB | 1283692 | 8/1972 |

OTHER PUBLICATIONS

Derwent abstract of DE 19845761, Apr. 20, 2000.*

* cited by examiner

*Primary Examiner*—Karl Group
(74) *Attorney, Agent, or Firm*—Brinks Hofer Gilson & Lione

(57) ABSTRACT

A refractory system for glass melting furnaces includes alumina, zirconia, and silica mixed with a silica binder. The refractory may be formed as refractory blocks or directly onto the wear portion of a glass melting furnace. The refractory may be formed using casting, pumping, or shotcreting methods.

18 Claims, 1 Drawing Sheet

REFRACTORY SYSTEM FOR GLASS MELTING FURNACES

RELATED APPLICATIONS

This application claims the benefit of U.S. Provisional Patent Application No. 60/432,503, filed Dec. 10, 2002, the entire disclosure of which is hereby incorporated herein by reference.

FIELD OF THE INVENTION

This invention generally relates to refractories for glass melting furnaces. More particularly, this invention relates to colloidal silica refractories for the lining of glass melting furnaces.

BACKGROUND

Glass melting furnaces are refractory lined vessels shaped as a container for melting and holding glass. In the melting operation, the incoming glass making materials are heated to about 2800° F. (1550° C.). The glass making materials usually include a mixture of cullet and batch materials. Cullet is crushed glass from the manufacturing process. Batch materials include sand (silica), lime (limestone or calcium carbonate reduced to calcium monoxide), soda ash (sodium monoxide), and sometimes other materials such as feldspar, salt cake, and metal oxides. During the melting operation, the cullet melts first to increase the heat transfer to the batch materials and to reduce the melting time.

Glass melting furnaces include pot furnaces, glass tanks or tank furnaces, and the like. Pot furnaces have a crucible or bowl shape configuration and typically are used to melt smaller quantities of glass. Glass tanks range from smaller day tanks to larger continuous melt tanks. Day tanks are usually filled with glass making materials for overnight melting. Continuous melt tanks are large furnaces where glass making materials are charged at one end, melt, and flow to the other end for removal. Glass tanks typically are constructed of separate refractory brick or blocks within a steel frame. The blocks fit together without mortar and typically are arranged in a rectangular shape to hold molten glass. The mechanical pressure from the steel frame and outer blocks holds the blocks together. Glass tanks generally have regenerative chambers to preheat combustion air for higher flame temperatures.

The refractory blocks usually receive considerable wear from the molten glass and the charging of glass making materials. Molten glass is highly corrosive. The refractory blocks usually are made of composite clays having alumina, zirconia, and silica (AZS). The AZS refractory blocks are made from molten material cast into molds, which are machined after hardening.

The melting operation in continuous melt tanks continues essentially non-stop until the tank is no longer usable. During the melting operation, the refractory blocks can become deeply scored and may develop wear spots or portions where the molten glass has eroded or dissolved the refractory. The wear spots typically grow until the refractory fails to hold the molten glass. The wear spots shorten the service life of glass tanks and often are unpredictable, thus disrupting production of molten glass.

SUMMARY

This invention provides a refractory composition for glass melting furnaces. The refractory composition includes a first set of components mixed with a silica binder. The first set of components includes alumina, zirconia, and silica. The resulting refractory may be formed into refractory blocks or directly onto the wear portion of a glass melting furnace. The refractory may be formed using casting, pumping, or shotcreting methods.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
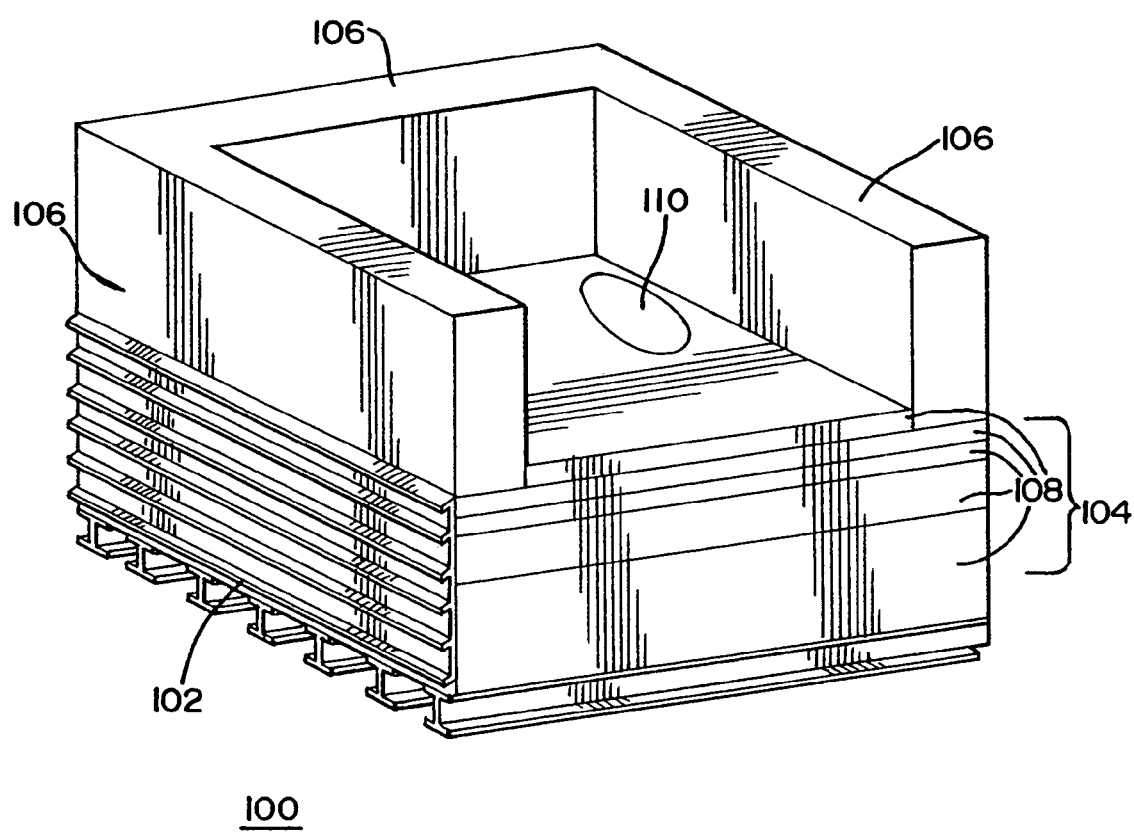
FIG. 1 represents a partial perspective view of a glass tank with a colloidal silica refractory system according to one embodiment of the invention.

FIG. 1 represents a partial perspective view of a glass melting furnace or tank 100 with a refractory system. The glass tank 100 may have additional features and components such as melting and refining chambers, regenerators, burners, and the like, which are not shown. The glass tank 100 has a frame 102 supporting a hearth 104 and sidewalls 106. The frame 102 is made of steel plates and beams and may comprise other materials suitable for a glass melting furnace. The sidewalls 106 extend vertically from the hearth 104 to form a container shape for melting and holding glass. The hearth 104 has one or more hearth linings 108 of refractory materials. The sidewalls 106 also have one or more sidewall linings of refractory materials. The linings may have the same or different refractory materials. The refractory materials are bricks, blocks, or a monolithic configuration. The blocks comprise alumina, zirconia, silica, a combination thereof, or another suitable refractory for glass melting furnaces. The blocks may also comprise a silica binder. The glass tank 100 also has a patch lining 110 formed over a wear portion of the hearth 104. The wear portion may be anywhere along the inside of the glass tank including the hearth and sidewalls and above or below the molten glass. There may be one or more patch linings on the hearth 104 and/or the sidewalls 106. The patch lining 100 comprises a refractory, such as a colloidal silica refractory. While particular configurations are shown, the glass tank 100 may have other configurations including those with fewer or additional components.

In one embodiment, the refractory comprises a mixture of a silica binder with a first set of components. The silica binder is in the range of about 5 weight percent through about 20 weight percent of the dry weight of the first set of components, preferably between 6 and 12 weight percent of the dry weight of the first set of components. In one embodiment, the binder is a colloidal silica binder. The first set of components includes alumina ($Al_2O_3$), zirconia ($ZrO_2$), and silica ($SiO_2$). The first set of components may be dry or wet and also may include other minerals, a setting agent like magnesia (MgO), and/or a flow modifier.

The alumina, zirconia, and silica provide strength and corrosion resistance. The alumina may be provided by a high aluminum aggregate such as tabular or white fused alumina. The alumina also may be reactive or calcined. The zirconia may be provided by zircon flour or a zirconia bearing material. The silica may be provided by mullite (aluminum silicate), microsilica, colloidal silica, or the like.

The silica binder holds or binds the first set of components together in a monolithic form. In one embodiment, the binder is a colloidal silica binder. The colloidal silica binder comprises colloidal silica in water, where the colloidal silica is in the range of about 15 weight percent through about 70 weight percent. In one embodiment, the colloidal silica may have an average particle diameter in the range of about 4 millimicrons through about 100 millimicrons.

The first set of components include about 50 weight percent (wt %) to about 70 wt % alumina, about 10 to about 25 wt % zircon, and about 15 to about 35 wt % mullite. Preferably, first set of components include about 55 wt % to about 60 wt % alumina, about 15 to about 20 wt % zircon, and about 21 to about 27 wt % mullite. Other proportions of the first set of components may be used. The first set of components may include other compounds such as about 0.1 weight percent magnesia. The amount of magnesia may be adjusted to increase or decrease the setting time for the colloidal system refractory. The first set of components also may include a flow modifier to enhance or alter the flow properties for forming the colloidal silica refractory prior to setting. The first set of components may be mixed prior to the addition of the colloidal silica binder. The resulting refractory comprises about 65 to about 80 wt % alumina, about 7 to about 15 wt % zirconia, and about 10 to about 20 wt % silica For illustration purposes and not as a limitation, Table 1 provides exemplary types and proportions of first set of components for the colloidal silica refractory system.

TABLE 1

| Raw Material | Mesh Size | Wt % |
| --- | --- | --- |
| Tabular Alumina | ¼ × 8 | 19.296 |
| Tabular Alumina | 8 × 14 | 19.296 |
| Tabular Alumina | −28 M | 4.824 |
| Zircon Flour | −325 M | 16.844 |
| Fused Mullite | −40 M | 24.12 |
| Reactive Alumina (e.g., CAR 120B from Alcan) | −325 M | 4.824 |
| Calcined Alumina (e.g., CAR 60RG from Alcan) | −325 M | 9.648 |
| Al Powder | −100 M | 0.965 |
| MgO 98% | −200 M | 0.096 |

The components are commercially available from Alcon and other suppliers. The first set of components may be mixed together prior to mixing with the colloidal silica binder. The first set of components may also be wet or dry prior to mixing with the colloidal silica binder. The mixture cures or sets into a colloidal silica refractory, which comprises about 72.5 weight percent alumina, about 11.2 weight percent zirconia, and about 15.6 weight percent silica. The colloidal silica refractory may be cast into blocks for subsequent use in a glass tank or may be formed directly onto the wear portion of a glass tank. The colloidal silica refractory may be formed on the wear portion using one or more refractory forming methods such as casting, pumping, or shotcreting (formless pumping with a setting accelerant). The colloidal silica refractory may be formed on one or more portions of the sidewall or hearth. The colloidal silica refractory may be formed directly on the wear portion without the replacement of refractory blocks in a glass tank.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

The invention claimed is:

1. A refractory composition comprising:
   a colloidal silica binder; and
   a first set of components comprising about 50 to about 70 wt % alumina, about 10 to about 25 wt % zircon, and about 15 to about 35 wt % mullite, where the colloidal silica binder is in the range of about 5 wt % through about 20 wt % of the dry weight of the first set of components.

2. The refractory composition according to claim 1, where the first set of components comprises about 55 to about 60 wt % alumina, about 15 to about 20 wt % zircon, and about 21 to about 27 wt % mullite.

3. The refractory composition according to claim 1, where the colloidal silica binder is in the range of about 8 wt % through about 12 wt % of the dry weight of the first set of components.

4. The refractory composition according to claim 1, further comprising a setting agent.

5. The refractory composition according to claim 4, where the setting agent is magnesia.

6. The refractory composition according to claim 1, where the refractory composition is formed on at least one wear portion of a glass tank.

7. The refractory composition according to claim 1, where the refractory composition comprises about 70 to about 75 wt % alumina, about 9 to about 13 wt % zirconia, and about 13 to about 17 wt % silica.

8. A method of preparing a refractory for a glass melting furnace, comprising:
   providing a refractory composition comprising a colloidal silica binder and about 65 to about 80 wt % alumina, about 7 to about 15 wt % zirconia, and about 10 to about 20 wt % silica; and;
   forming the refractory composition on the surface of the glass melting furnace.

9. The method of claim 8 wherein the refractory composition is formed from the colloidal silica binder and a first set of components comprising about 50 to about 70 wt % alumina, about 10 to about 25 wt % zircon, and about 15 to about 35 wt % mullite, wherein the colloidal silica binder is in the range of about 5 wt % to about 20 wt % of the dry weight of the first set of components.

10. The method of claim 9 further comprising the step of mixing the first set of components with the colloidal silica binder.

11. The method of claim 8, wherein the refractory composition is formed by casting.

12. The method of claim 8, wherein the refractory composition is formed by pumping.

13. The method of claim 8, wherein the refractory composition is formed by shotcreting.

14. The method of claim 8 wherein the refractory composition further comprises a setting agent.

15. A method of preparing a refractory for a glass melting furnace, comprising:
    providing a silica binder;
    providing a first set of components comprising about 50 to about 70 wt % alumina, about 10 to about 25 wt % zircon, and about 15 to about 35 wt % mullite;
    mixing the first set of components with the silica binder to form a refractory composition; and
    forming the refractory composition on the surface of the glass melting furnace.

16. A method of preparing a refractory for a glass melting furnace, comprising:
    providing a refractory composition comprising a silica binder and a first set of components, wherein the first set of components comprises about 50 to about 70 wt % alumina, about 10 to about 25 wt % zircon, and about 15 to about 35 wt % mullite; and
    forming the refractory composition on the surface of the glass melting furnace by a method selected from casting, pumping, and shotcreting.

17. The refractory composition according to claim 1, where the refractory composition comprises about 65 to about 80 wt % alumina, about 7 to about 15 wt % zirconia, and about 10 to about 20 wt % silica.

18. A refractory composition comprising:
    a colloidal silica binder;
    a selling agent comprising magnesia; and
    a first set of components, where the colloidal silica binder is in the range of about 5 wt % through about 20 wt % of the dry weight of the first set of components and where the refractory composition comprises about 65 to about 80 wt % alumina, about 7 to about 15 wt % zirconia, and about 10 to about 20 wt % silica.

* * * * *

UNITED STATES PATENT AND TRADEMARK OFFICE
CERTIFICATE OF CORRECTION

PATENT NO. : 7,176,153 B2  
APPLICATION NO. : 10/731343  
DATED : February 13, 2007  
INVENTOR(S) : Michael W. Anderson It is certified that error appears in the above-identified patent and that said Letters Patent is hereby corrected as shown below:

In the Claims

Column 4, in claim 8, line 53, after "20 wt % silica;" delete "and;" and substitute --and-- in its place.

Signed and Sealed this

Twelfth Day of June, 2007

JON W. DUDAS  
*Director of the United States Patent and Trademark Office*